(12) United States Patent
Noel et al.

(10) Patent No.: US 6,427,936 B1
(45) Date of Patent: Aug. 6, 2002

(54) OPTICAL FIBER CABLE MANAGEMENT APPARATUS

(75) Inventors: Lucien Noel, Bronx; Kan S. Liu, New York; John Holmes, Monroe; Lawrence Duffy; Yevgeniy Lvovskiy, both of New York, all of NY (US); Willie Braun, Franklin Lake, NJ (US); Albert Pedoeem, Orange, NY (US)

(73) Assignee: Fujitsu Network Communications, Inc., Richardson, TX (US)

( * ) Notice: Subject to any disclaimer, the term of this patent is extended or adjusted under 35 U.S.C. 154(b) by 7 days.

(21) Appl. No.: 09/692,300

(22) Filed: Oct. 19, 2000

(51) Int. Cl.[7] ............................................... B65H 75/44
(52) U.S. Cl. ...................................... 242/399; 242/700
(58) Field of Search .................................. 242/399, 398, 242/159, 160.1, 170, 539, 548, 588, 588.1, 588.3, 590, 592, 607, 607.1; 312/23, 25, 28, 29, 30, 34.18, 273, 282, 322, 323, 223.1

(56) References Cited

U.S. PATENT DOCUMENTS

| | | | | |
|---|---|---|---|---|
| 689,588 A | * | 12/1901 | Hoult | |
| 1,726,235 A | * | 11/1929 | Kersburg | |
| 2,238,004 A | * | 4/1941 | Wolters | 45/2 |
| 2,372,504 A | * | 3/1945 | Lindros | 45/96 |
| 2,423,919 A | * | 7/1947 | Wolters | 45/2 |
| 2,492,871 A | * | 12/1949 | King | 45/96 |
| 2,519,632 A | * | 8/1950 | Brinker | 45/2 |
| 2,918,342 A | * | 12/1959 | Tarte, Jr. | 312/330 |
| 6,027,186 A | * | 2/2000 | Liou | 312/9.48 |

* cited by examiner

Primary Examiner—Donald P. Walsh
Assistant Examiner—Mark J. Beauchaine
(74) Attorney, Agent, or Firm—Weingarten, Schurgin, Gagnebin & Lebovici LLP

(57) ABSTRACT

A fiber cable storage and management apparatus. The apparatus includes front and rear sections interconnected by a hinge. The front section is configured to hold a length of fiber cable, and both the front and rear sections are slidingly mountable to an electronic chassis. The front section of the fiber cable storage and management apparatus may be alternately retracted out of and inserted into the housing of the electronic chassis. When the front section is retracted out of the electronic chassis housing, the hinge can pivot between a first position in which the front and rear sections of the apparatus are substantially coplanar and a second position in which the front section is rotated below the plane of the rear section. By sliding the front section of the apparatus out of the electronic chassis housing and then rotating the front section downward, easy access is provided to fiber cable stored on the front section.

7 Claims, 3 Drawing Sheets

OPTICAL FIBER CABLE MANAGEMENT APPARATUS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to optical fiber cable storage and management apparatus, and more specifically to fiber cable storage and management apparatus that can be easily integrated with station equipment of a computer or telecommunications network.

In recent years, the use of optical fiber cables for providing Internet, voice, and data services has been rapidly increasing. In general, an optical fiber cable includes a plurality of optical fibers. To deliver such multi-fiber cables to station equipment (e.g., multiplexors, data terminals, computers, etc.) installed at central offices or business/residential premises in a computer or telecommunications network, fiber storage and management devices are often used to provide connection points for a number of the optical fibers. Traditional fiber storage and management devices are typically discrete modules that are frequently made of plastic. Each module typically includes a spool around which fiber loops can be wrapped in a circular fashion. Such fiber storage and management devices not only provide storage for fiber splices and slack, but also provide strain relief, dust-proofing, and protection for the optical fibers.

One drawback of traditional fiber storage and management devices is that they are discrete and therefore easily lost or misplaced. Further, such devices are usually not easily incorporated into the different types of station equipment coupled to a computer or telecommunications network. Still further, those fiber storage and management devices that can be incorporated into station equipment often require a significant amount of space to enable a technician to access the optical fibers stored therein. Yet further, the overall size of the station equipment generally increases with the space requirements of the fiber storage and management devices.

It would therefore be desirable to have a fiber cable storage and management apparatus that can be easily integrated with station equipment of a computer or telecommunications network. Such a fiber cable storage and management apparatus would have minimum space requirements so as to reduce the overall size of the station equipment.

BRIEF SUMMARY OF THE INVENTION

In accordance with the present invention, a fiber cable storage and management apparatus is provided that includes front and rear sections interconnected by a hinge. The front section is configured to hold a length of fiber cable, and both the front and rear sections are slidingly mountable to an electronic chassis. The front section of the fiber cable storage and management apparatus can be alternately retracted out of and inserted into the housing of the electronic chassis. When the front section is retracted out of the electronic chassis housing, the hinge can pivot between a first position in which the front and rear sections of the apparatus are substantially coplanar and a second position in which the front section is rotated below the plane of the rear section. By sliding the front section of the fiber cable storage and management apparatus out of the electronic chassis housing and then rotating the front section downward, easy access is provided to the fiber cable stored on the front section.

In one embodiment, a cable storage apparatus includes a first portion including a first section, a second section, and a hinge interconnecting the first and second sections, the first section being configured to hold a length of cable; and, a second portion for supporting the first portion, the second portion being adapted to slidingly receive the first portion and retain the first portion with the first and second sections in a generally coplanar relationship when supported by the second portion.

Other features, functions, and aspects of the fiber cable storage and management apparatus will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

Figure 1:
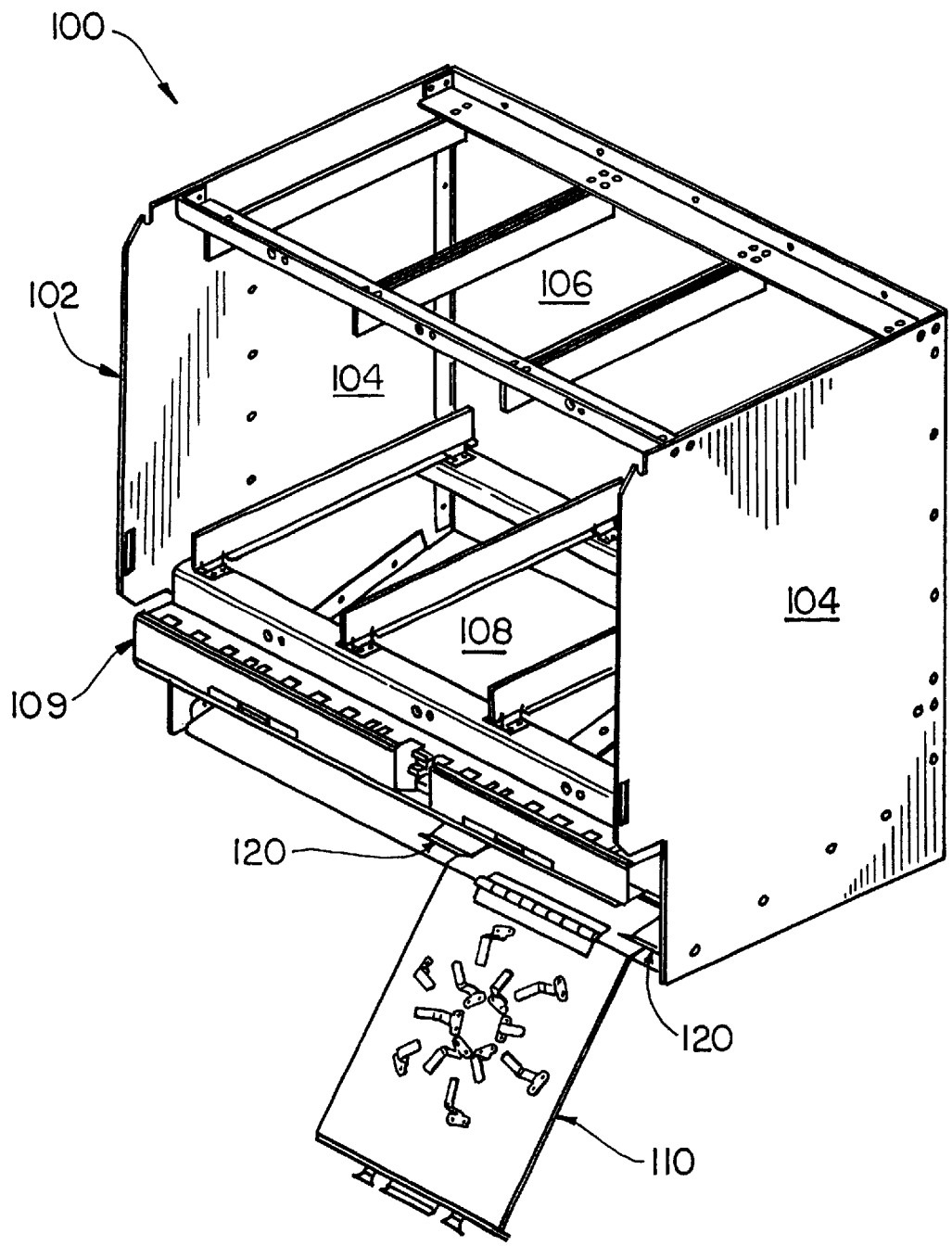
FIG. 1 is a perspective view of station equipment incorporating a fiber cable storage and management apparatus according to the present invention.

FIG. 1 is a perspective view of station equipment 100 incorporating an illustrative embodiment of a fiber cable manager 110 in accordance with the present invention. The station equipment 100 includes an electronic chassis 102 having generally planar side and back walls 104 and 106, and an inclined lower support section 108, which in this illustrative embodiment is a baffle. Those of ordinary skill in the art will appreciate that the lower support section 108 may alternatively include a horizontal support section.

The station equipment 100 may be a multiplexor, a data terminal, a computer, telecommunications equipment, or any other electronic and/or computerized device that may be installed at a central office, a business, a residence, or other suitable location in a computer or telecommunications network. In the illustrated embodiment, the electronic chassis 102 may house a backplane assembly at the back wall 106 and a shelf assembly between the opposing sidewalls 104. For example, the backplane assembly may include a motherboard with a plurality of connectors mounted thereto for receiving respective daughter cards and/or modules supported by the shelf assembly; and, at least one of the daughter cards and/or modules may include optical interfaces for receiving signals over an optical fiber cable, a portion of which may rest in a cable trough 109. It should be understood, however, that FIG. 1 merely depicts an exemplary embodiment of the electronic chassis 102, and that other alternative embodiments or variations may be made.

As mentioned above, at least one daughter card and/or module included in the station equipment 100 may receive signals provided by an optical fiber cable. For this reason, the station equipment 100 includes the fiber cable manager 110, which can be used to store and manage a number of fiber loops. In a preferred embodiment, the station equipment 100 includes a plurality of such fiber cable managers 110, each of which is slidingly coupled to the lower support section 108 of the-station equipment 110 by a respective pair of brackets 120 (see also FIG. 4). It is noted, however, that one or more of the plurality of fiber cable managers 110 may alternatively be slidingly coupled to, e.g., one of the sidewalls 104, the back wall 106, a top cover (not shown), or an intermediate support section of the electronic chassis 102.

Figure 2:
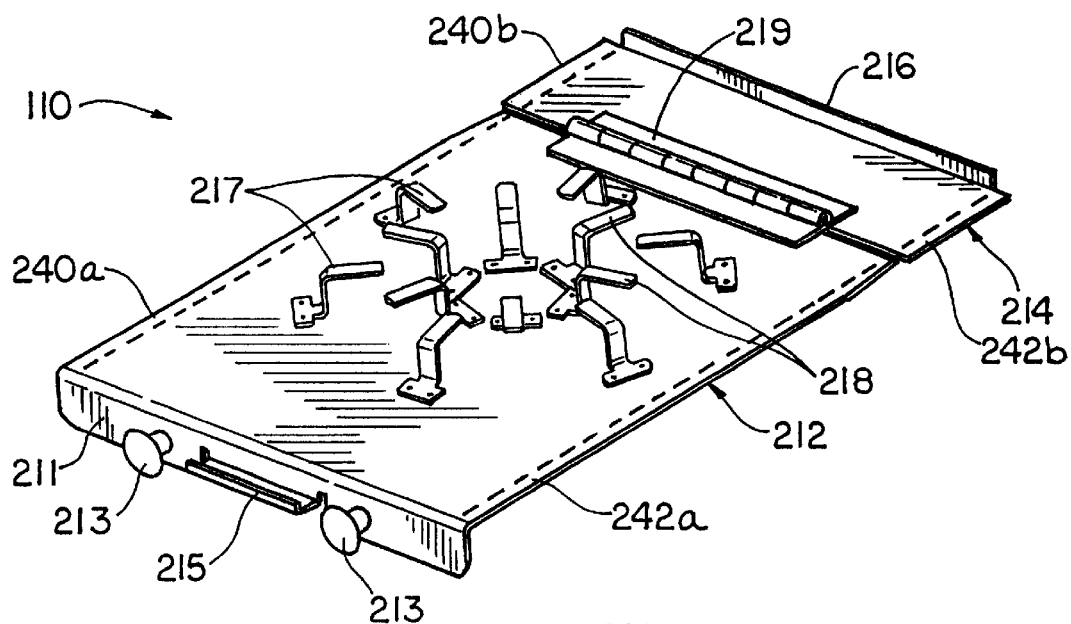
FIG. 2 is a perspective view of the fiber cable storage and management apparatus of FIG. 1.

As depicted in FIG. 2, the fiber cable manager 110 includes a generally planar front section 212 coupled to a generally planar rear section 214 by a hinge 219, which is of a type to allow the front section 212 to swing between a first position coplanar with the rear section 214 and a second position below the plane of the rear section 214. When the front and rear sections 212 and 214 are coplanar, narrow edge regions 240a, 240b, 242a, and 242b (generally indicated by broken lines in FIGS. 2 and 3) of the front and rear sections 212 and 214 can slide between the respective brackets 120 and the lower support section 108. For example, a technician may grasp a handle 215 formed in a front flange portion 211 of the fiber cable manager 110 to slidingly retract (insert) the front section 212 out of (into) the housing of the electronic chassis 102. The hinge 219 is suitably attached to the front and rear sections 212 and 214 between the narrow edge regions 240a/242a and 240b/242b to provide sufficient clearance between the hinge 219 and the brackets 120 as the fiber cable manager 110 is alternately slid out of and into the electronic chassis 102.

Figure 4:
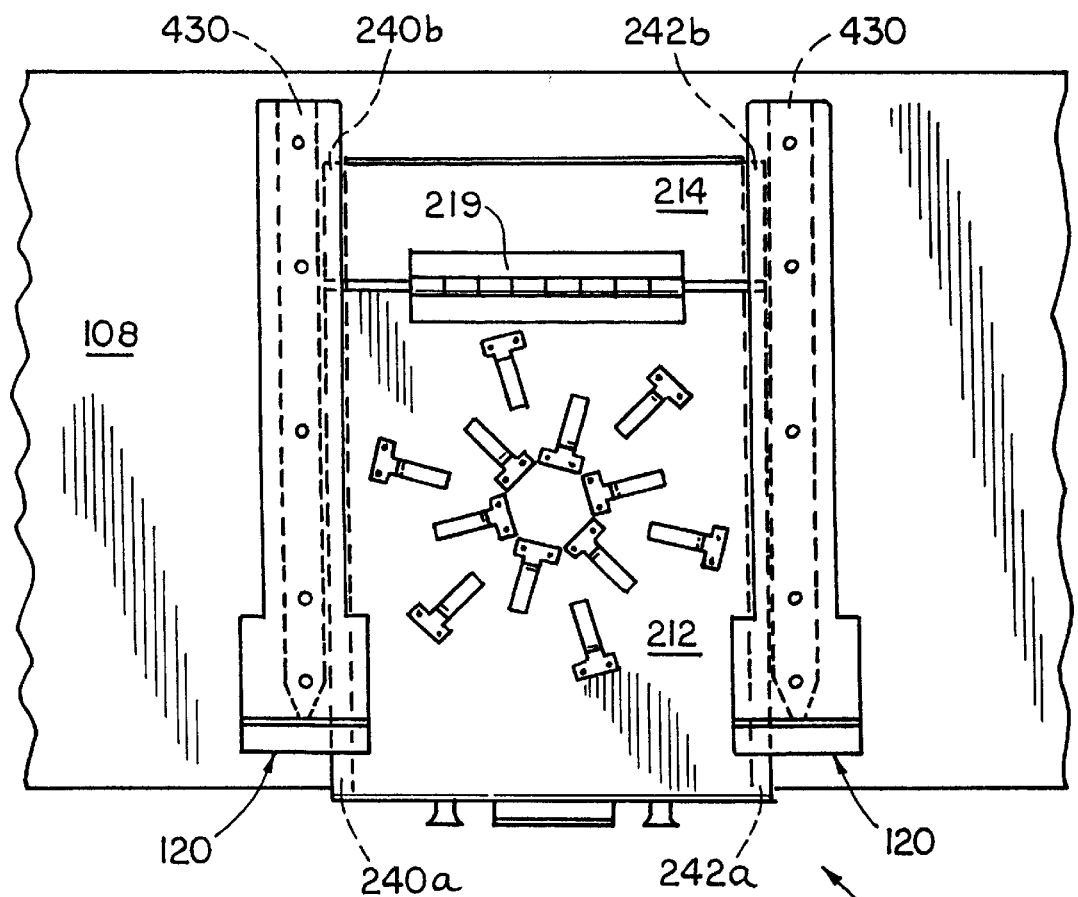
FIG. 4 is a top plan view of the fiber cable storage and management apparatus of FIG. 1 coupled to the station equipment by a bracket and a spacer.

FIG. 4 depicts a preferred embodiment of the bracket 120 and a spacer 430, which in combination slidingly couple the fiber cable manager 110 to the lower support section 108 of the electronic chassis 102. Each bracket 120 coupling the fiber cable manager 110 to the lower support section 108 has a corresponding spacer 430. Further, each bracket/ spacer combination used to slidingly couple the fiber cable manager 110 to the lower support section 108 is preferably like the bracket/spacer combination of FIG. 4.

As mentioned above, when the front section 212 is coplanar with the rear section 214 of the fiber cable manager 110, the narrow edge regions 240a, 240b, 242a, and 242b of the front and rear sections 212 and 214 can slide between the respective brackets 120 and the lower support section 108 of the electronic chassis 102. As depicted in FIG. 4, the brackets 120 and spacers (shown in phantom at reference numeral 430) are mounted to the lower support section 108 by suitable fasteners such as screws or rivets, which pass through corresponding holes in the brackets 120 and the spacers 430 (see also FIG. 5). Each spacer 430 is preferably narrower than its corresponding bracket 120. Further, the brackets 120 and the spacers 430 are mounted to the lower support section 108 such that the spacers 430 are sufficiently spaced apart to receive the fiber cable manager 110, and the brackets 120 sufficiently overlap the narrow edge regions 240a, 240b, 242a, and 242b of the front and rear sections 212 and 214 to support the fiber cable manager 110 on the lower support section 108.

Figure 5:
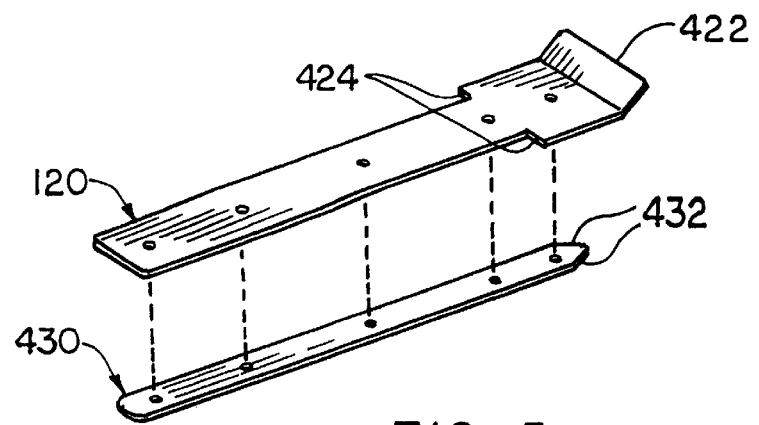
FIG. 5 is a perspective, exploded view of the bracket and the spacer of FIG. 4.

As depicted in FIG. 5, each bracket 120 includes a flange 422 at a proximal end thereof that slants away from the lower support section 108 when the bracket 120 and the spacer 430 are mounted to the lower support section 108. Further, each spacer 430 includes at least one bevel 432 at a proximal end thereof; and, the front-section 212 includes a pair of bevels 360 (see FIG. 3) at an end adjacent the rear section 214. The slanted flanges 422 of the brackets 120, the bevels 432 of the spacers 430, and the bevels 360 of the front section 212 facilitate the sliding of the front section 212 of the fiber cable manager 110 out of and into the electronic chassis 102 by reducing potential obstructions between the narrow edge regions 240a, 240b, 242a, and 242b and the brackets 120/spacers 430.

The rear section 214 includes a flange 216 (see FIG. 2), and the bracket 120 includes steps 424 (see FIG. 4). When the bracket/spacer combination slidingly couples the fiber cable manager 110 to the lower support section 108, the flange 216 of the rear section 214 and the steps 424 of the bracket 120 cooperate to limit the extent to which the fiber cable manager 110 can be retracted from the electronic chassis 102. For example, the front section 212 of the fiber cable manager 110 may be slid out of the electronic chassis 102 until the flange 216 contacts the steps 424, at which point the front section 212 is outside the housing the electronic chassis 102. In the illustrated embodiment, when the flange 216 contacts the steps 424, the edge regions 240b and 242b of the rear section 214 of the fiber cable manager 110 remain between the respective brackets 120 and the lower support section 108 of the electronic chassis 102. Further, when the front section 212 of the fiber cable manager 110 is outside the electronic chassis 102, the front section 212 is free to swing on the hinge 219 to a position below the planes of the rear section 214 and the lower support section 108.

The front flange portion 211 of the fiber cable manager 110 similarly limits the extent to which the fiber cable manager 110 can be inserted into the electronic chassis 102. For example, the front section 212 of the fiber cable manager 110 may be inserted into the electronic chassis 102 until the front flange portion 211 contacts the edge of the lower support section 108, at which point the front section 212 is inside the housing of the electronic chassis 102. In a preferred embodiment, the fiber cable manager 110 includes at least one fastener suitable for maintaining the front section 212 inside the electronic chassis 102. In the illustrated embodiment, the fiber cable manager 110 includes at least one knob 213 having an integral shaft (not shown) passing through an opening in the front flange portion 211 of the fiber cable manager 110. The knob shaft can be press-fit into a corresponding hole in a face portion (not shown) of the electronic chassis 102 to prevent the front section 212 of the fiber cable manager 110 from inadvertently sliding out of the electronic chassis 102.

As mentioned above, the fiber cable manager 110 can be used to store and manage a number of fiber loops. Specifically, when optical fibers included in a multi-fiber cable are spliced, a sufficient amount of fiber slack is usually provided near the splices. Such fiber slack is needed to allow a technician to pull the optical fibers from the station equipment, prepare the fiber ends, and then splice them together. After spicing the optical fibers, the technician normally wraps the fiber slack to form at least one fiber loop. In the illustrated embodiment, a first plurality of posts 217 and a second plurality of posts 218 (see FIGS. 2 and 3) are mounted to a surface of the front section 212 of the fiber cable manager 110 to facilitate the storage and management of these fiber loops. The second plurality of posts 218 defines a generally circular path about which the optical fibers can be wrapped. Further, the posts 217 and 218 have respective flange portions that cooperate to prevent the optical fibers wrapped between the posts 217 and 218 from inadvertently unraveling. Accordingly, by sliding the front section 212 of the fiber cable manager 110 to a position outside the electronic chassis 102 and then rotating the front section 212 to a position below the planes of the rear section 214 and the lower support section 108 of the electronic chassis 102, the technician is provided with easy access to the posts 217 and 218 for subsequent removal and/or storage of the optical fibers.

Figure 3:
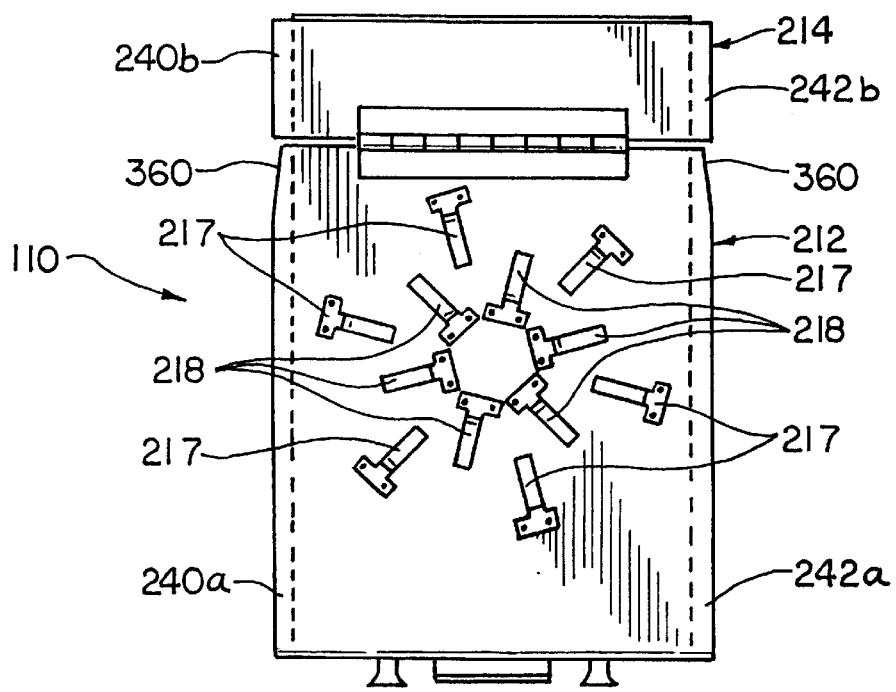
FIG. 3 is a top plan view of the fiber cable storage and management apparatus of FIG. 1.

It should be understood that the configuration of the first and second pluralities of posts 217 and 218 depicted in FIGS. 2 and 3 is exemplary and that alternative configurations or variations may be made. For example, at least one spool may be mounted to the surface of the front section 212 of the fiber cable manager 110 in place of the posts 217 and 218 to hold the optical fibers.

The front and rear sections 212 and 214 of the fiber cable manager 110, the hinge 219, the bracket 120, and/or the spacer 430 may be made of any suitable material such as metal or high-impact plastic. Further, the fiber cable manager 110 can be incorporated into any suitable type of station equipment that is capable of slidably receiving the front and rear sections 212 and 214 of the fiber cable manager 110 and retaining the front and rear sections 212 and 214 in the equipment. Moreover, those of ordinary skill in the art will appreciate that the fiber cable manager 110 can be used to store and manage not only optical fiber cables, but any other suitable cable such as copper cable.

Those of ordinary skill in the art should further appreciate that variations to and modification of the above-described fiber cable storage and management apparatus may be made without departing from the inventive concepts disclosed herein. Accordingly, the present invention should be viewed as limited solely by the scope and spirit of the appended claims.

What is claimed is:

1. A cable storage apparatus, comprising:
   a first portion including a first section, a second section, and a hinge interconnecting the first and second sections, the first section being configured to hold a first length of cable; and
   a second portion for supporting the first portion, the second portion including a third section configured to hold a second length of the cable, the second portion being adapted to slidingly receive the first portion and retain the first portion with the first and second sections in a generally coplanar relationship when supported by the second portion.

2. The cable storage apparatus of claim 1 wherein the hinge is adapted to pivot between a first position and a second position, the first position causing the first and second sections to be generally coplanar, and the second position causing the first and second sections to be generally noncoplanar when the second section is supported by the second portion.

3. The cable storage apparatus of claim 1 wherein the first and second sections are adapted to slide between a first position and a second position, the first position causing the first and second sections to be supported by the second portion, and the second position causing the second section to be supported by the second portion.

4. The cable storage apparatus of claim 1 wherein the second portion includes respective brackets for supporting opposite edge regions of the first portion.

5. The cable storage apparatus of claim 4 wherein the second portion further includes a plurality of spacers coupled to the respective brackets.

6. The cable storage apparatus of claim 1 further including a plurality of posts mounted to the first section and defining a path about which the length of cable can be wrapped.

7. The cable storage apparatus of claim 1 further including a spool mounted to the first section and defining a path about which the length of cable can be wrapped.

* * * * *